US012687962B2

(12) United States Patent
Fiore et al.

(10) Patent No.: US 12,687,962 B2
(45) Date of Patent: Jul. 21, 2026

(54) DUAL-PORT INTERPOSER FOR STORAGE DRIVES

(71) Applicant: NetApp, Inc., San Jose, CA (US)

(72) Inventors: Edward Joseph Fiore, Ramsey, MN (US); Reyaz Ahmed, Fremont, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/785,255

(22) Filed: Jul. 26, 2024

(65) Prior Publication Data

US 2026/0029915 A1     Jan. 29, 2026

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/061; G06F 3/0655; G06F 3/0679
USPC .......................................................... 710/74
See application file for complete search history.

(56) References Cited

U.S. PATENT DOCUMENTS

| | | | |
|---|---|---|---|
| 10,402,363 B2 | 9/2019 | Long et al. | |
| 10,534,738 B2 * | 1/2020 | Ranjan ................ | G06F 13/4027 |
| 10,866,923 B2 | 12/2020 | Long et al. | |
| 11,016,924 B2 | 5/2021 | Olarig et al. | |
| 11,290,533 B2 * | 3/2022 | Lee ....................... | G06F 3/0607 |
| 2005/0102468 A1 * | 5/2005 | Delaney ............... | G06F 3/0607 |
| | | | 711/114 |

| | | | |
|---|---|---|---|
| 2014/0082260 A1 * | 3/2014 | Oh ...................... | G06F 12/0246 |
| | | | 711/103 |
| 2015/0127895 A1 * | 5/2015 | Malwankar ............ | G06F 3/067 |
| | | | 711/103 |
| 2015/0134868 A1 * | 5/2015 | Shaeffer .............. | G06F 13/4063 |
| | | | 710/300 |
| 2019/0107956 A1 | 4/2019 | Kachare et al. | |
| 2020/0026683 A1 | 1/2020 | Olarig | |
| 2022/0357894 A1 * | 11/2022 | Liu ......................... | G06F 3/061 |
| 2023/0198182 A1 | 6/2023 | Olarig et al. | |
| 2023/0244614 A1 * | 8/2023 | Benisty .............. | G06F 13/1668 |
| | | | 710/107 |
| 2023/0393772 A1 * | 12/2023 | Benisty .................. | G06F 3/067 |

OTHER PUBLICATIONS

International Application No. PCT/US2025/038582, International Search Report, Written Opinion, 11 pages, Oct. 21, 2025.

* cited by examiner

*Primary Examiner* — Christopher B Shin

(57) ABSTRACT

Techniques, equipment, and systems for enhanced storage systems and storage drive interfacing are presented herein. In one example, a storage interposer includes a storage device connector configured to couple a dual port interface selected among a first interface protocol and a second interface protocol, and a protocol unit configured to transfer storage transactions received over the dual port interface in a storage format. The storage interposer also includes a transaction unit configured to obtain the storage transactions in the storage format and process indications of which port among the dual port interface supplied each of the storage transactions against one or more criteria to order the storage transactions into a queue shared among the ports. A single port storage drive coupled to the storage interposer can be issued the storage transactions from the queue according to the order.

21 Claims, 7 Drawing Sheets

DUAL-PORT INTERPOSER FOR STORAGE DRIVES

BACKGROUND

In large computing centers and cloud computing environments, arrays of mass storage drives might be employed in concert with various processing elements and network routing elements. In the past, rotating magnetic media (e.g., HDDs) have been deployed in such computing environments. However, as storage drives increase in speed and storage capacity, especially among solid state storage drives (e.g., SSDs), hosts might lack the individual bandwidth to saturate drive interfaces.

This increase in drive performance by SSDs and other drive technologies has led to the use of more advanced storage interfaces and also dual-port storage drives which can handle storage transactions issued by two hosts concurrently. However, these dual-port drives can be expensive, difficult to deploy and interchange among various brands and types, and less available in commodity configurations typical of mass storage deployments.

Furthermore, most storage drives are tied to a particular storage interface or storage protocol. This can further limit where storage drives can be deployed in computing environments, and complicate replacement or maintenance tasks where operators must be aware of each individual drive interface or type before replacement or before initial installation into racks of many storage drives.

SUMMARY

Techniques, equipment, and systems for enhanced storage systems and storage drive interfacing are presented herein. In one example implementation, a storage interposer includes a storage device connector configured to couple a dual port interface selected among a first interface protocol and a second interface protocol, and a protocol unit configured to transfer storage transactions received over the dual port interface in a storage format. The storage interposer also includes a transaction unit configured to obtain the storage transactions in the storage format and process indications of which port among the dual port interface supplied each of the storage transactions against one or more criteria to order the storage transactions into a queue shared among the ports. A single port storage drive coupled to the storage interposer can be issued the storage transactions from the queue according to the order.

In another example implementation, an apparatus includes a host interface configured to couple a dual port interface selected among a first interface protocol and a second interface protocol. The apparatus also includes a drive interface configured to couple a single port storage drive. The apparatus also includes an interposer processor configured to detect among a first interface protocol and a second interface protocol at the host interface, transfer storage transactions received over the dual port interface in a storage format, and process indications of which port among the dual port interface supplied each of the storage transactions against one or more criteria to order the storage transactions into a queue shared among the ports. The single port storage drive can be issued the storage transactions from the queue according to the order.

In yet another example implementation, a method includes detecting among a first interface protocol and a second interface protocol employed for a dual port host interface. The method also includes processing indications of which port among the dual port host interface supplied each of the storage transactions against one or more criteria to order the storage transactions into a queue shared among the ports for issuance of the storage transactions to a single port storage drive from the queue according to the order.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Described herein are various enhanced storage handling elements, referred to as interposers, interposer modules, or storage drive carriers. In some of the example implementations discussed herein, an interposer can be included at a storage drive having a single port, and the interposer can provide dual port functionality for communicating with two hosts that concurrently issue storage transactions to the storage drive. Moreover, the control schemes and associated functionality discussed herein can be implemented in various hardware state machine circuitry to provide fairness criteria among the two hosts that share a single storage drive. The various implementations can provide multi-protocol support, such that the interposer is configured to auto-detect a storage protocol or communication protocol presented employed over a common storage connector, such that the storage drive is transparent to such protocol differences.

Functionality of these interposers can be integrated into various circuitry and apparatuses that accompany storage devices, but are not limited to such implementations. For example, the interposers can comprise modules insertable into a rack-mounted system, server, or storage assembly. The interposers can comprise elements such as storage add-in cards, or can be integrated into storage drive connectors/cabling that can be coupled between existing hosts and storage drives to provide various enhanced operations without altering the storage drives and hardware of the hosts. In further examples, storage drives can include such functionality and circuitry described herein.

Figure 1:
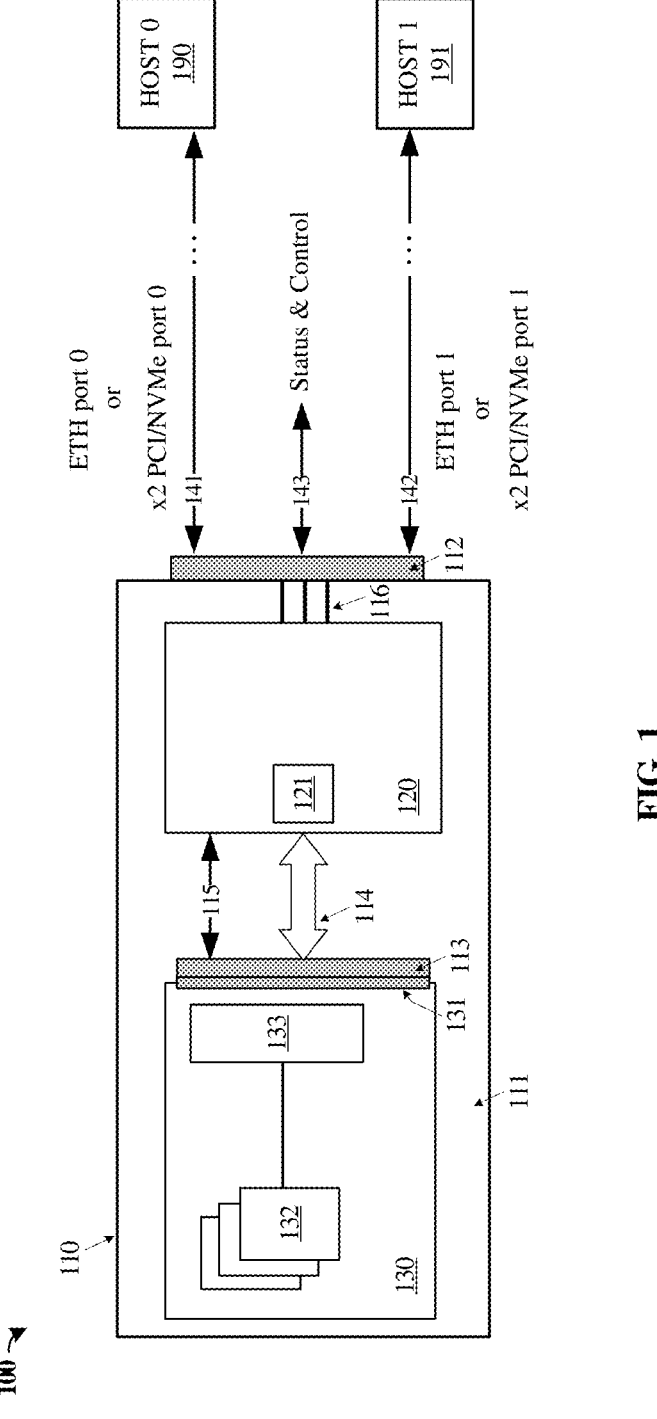
FIG. 1 is a diagram illustrating an example storage system in an implementation.

As a first example implementation, FIG. 1 is provided. FIG. 1 illustrates a system diagram of storage environment 100. Storage environment 100 includes hosts 190-191 which can issue storage transactions for a storage drive over corresponding communication links, such as links 141-142 shown in FIG. 1. Storage interposer assembly 110 is included in FIG. 1 which provides interfacing between hosts 190-191 and storage drive 130. Storage interposer assembly 110 includes carrier 111, front-end storage connector 112, back-end storage connector 113, storage drive link 114, sideband drive link(s) 115, interposer processor 120, and front-end connector links 116.

Interposer processor 120 includes queue 121, and can comprise hardware elements such as circuitry and logic that implement one or more control schemes or state machine arrangements to perform as described herein at least for ordering/interleaving of storage transactions. Interposer processor 120 can also comprise one or more microprocessors, processing devices, multi-core processors, processing circuitry, or other processing systems that can execute software or firmware. Interposer processor 120 can include one or more non-transitory memory devices, such as RAM, solid state storage, or other memory to store instructions comprising software or firmware that are executable by interposer processor 120 to operate as discussed herein. In some examples, interposer processor 120 comprises a microcontroller, microprocessor, field-programmable gate array (FPGA), application specific integrated circuit (ASIC), application specific processor, or other microprocessor or processing circuitry. Interposer processor 120 can include various communication interfaces, such as storage interfaces, packet/network interfaces, sideband interfaces, and other interfaces. In addition to storage transaction ordering, interposer processor 120 can perform protocol stack processing, packet/frame termination, transport layer processing/handling, protocol conversion, interface detection, and other functions.

Storage drive 130 comprises storage connector 131, storage media 132, and storage controller 133. Typically, storage drive 130 is a single-port device, referring to storage drive 130 being able to natively communicate with only a single host. However, some examples might include storage drive 130 being a dual-port device operated in a single-port mode. Storage connector 131 can comprise a U.2 connector (SFF-8639), U.3 connector, M.2 connector (NGFF), M.3 connector, or Enterprise and Data Center Standard Form Factor (EDSFF) connector, MCIO connector, Next Generation Small Form Factor (NGSFF/NF1), among others. Storage media 132 can comprise solid state storage media, such as flash memory, static RAM, NAND flash memory, NOR flash memory, memristors, or other solid state media. Instead of or in addition to solid state media, each storage media 132 can comprise magnetic storage, such as hard disk drives, tape drives, magnetoresistive memory devices, and the like, or can comprise optical storage elements, such as phase change memory. Storage controller 133 can receive storage transactions, such as read transactions and write transactions over storage connector 131 as transferred by interposer processor 120. Responsive to a read transaction, storage controller 133 can retrieve data from storage media 132 as identified by the read transaction, and transfer the data for delivery to an associated host that originated the storage transaction. Responsive to a write transaction, storage controller 133 can write data that accompanies the write transaction to storage media 132. Storage controller 133 can implement various storage control schemes, such as wear leveling, striping, mirroring, error checking and correction, encryption/decryption, deduplication, partitioning, virtual volume handling, and other techniques.

Links 141-142 and links 114-116 comprise various data communication links, such as Peripheral Component Interconnect Express (PCIe) links, Non-Volatile Memory Express (NVMe) links, Ethernet links, or other links, including various links that transport other storage interface communications. Various networks, communication fabrics, crosspoint switches, packet switching elements, controllers, distribution hubs, or other intermediary elements can be included between hosts 190-191 and storage interposer assembly 110, which can be represented by links 141-142. Various physical layer or link layer elements can be included to support links 141-143, such as MAC/PHY elements, discrete circuitry and logic, signal conditioning elements, signal detection elements, differential pair circuitry, amplifiers, clock signal extractors/generators, and other various elements. In this example, discrete sideband link 143 is shown, at least a portion of the sideband signaling can be carried over links 141-142. In other examples, link 143 carries protocol or link identification signaling, handshaking signaling, initialization signaling, manufacturing testing signaling, debug signaling, or other signaling. Example protocols and signaling for link 143 include System Management Bus (SMBus), Joint Test Action Group (JTAG), Inter-Integrated Circuit (I2C), controller area network bus (CAN), Universal Serial Bus (USB), or various discrete signaling.

When links 141-142 comprise PCIe links, these links can transport NVMe communications (or other storage protocols) over a designated quantity of PCIe lanes. For example, links 141-142 might each comprise two "×1" PCIe lanes, each forming a "×2" lane configuration for a total of four (4) lanes among links 141-142. PCIe also supports transfer of sideband signaling, such as SMBus interfaces and JTAG interfaces, as well as associated clocks, power, and bootstrapping, among other signaling.

When links 141-142 comprise Ethernet (ETH) links, these links can transport storage communications (or various storage formats) over a designated quantity of Ethernet Tx/Rx links which have a corresponding bandwidth or transfer speed. Ethernet can provide for encapsulating storage transactions over Ethernet, where the storage transport packet can comprise InfiniBand (IB), FibreChannel, NVMe, or NVM Express over Fabrics (NVMe-oF), among others. NVMe-oF comprises a network protocol which provides remote direct memory access (RDMA) over Ethernet networks instead of over directly-coupled PCIe links or PCIe fabrics. Examples of various Ethernet rates and standards include 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, and 800 GbE, among others.

Although PCIe links or ETH links storage links are shown in FIG. 1, it should be understood that additional or different communication links or buses can be employed, such as Serial Attached SCSI (SAS), FibreChannel, Thunderbolt, Serial Attached ATA Express (SATA Express), NVLink, Ultra Accelerator Link (UALink), Cache Coherent Interconnect for Accelerators (CCIX), Compute Express Link (CXL), Open Coherent Accelerator Processor Interface (OpenCAPI), wireless Ethernet or Wi-Fi (802.11x), or cellular wireless technologies, among others. When PCIe is employed, various versions or generations can be used, such as PCIe generations 3.0, 4.0, 5.0, 6.0, Gen-Z, and beyond. Any of the links in FIG. 1 can each use various communication media, such as air, space, metal, optical fiber, or some other signal propagation path, including combinations thereof. Any of the links in FIG. 1 can include any number of nested links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

Hosts 190-191 can each comprise a computer or server, among other computing devices which can include network-attached computing or processing devices, tablet computers, smartphones, gaming systems, laptop computers, desktop computers, elements of a distributed computing system, virtualized servers, virtual machines, containerized systems, graphics processing units, or other computing systems.

Figure 2:
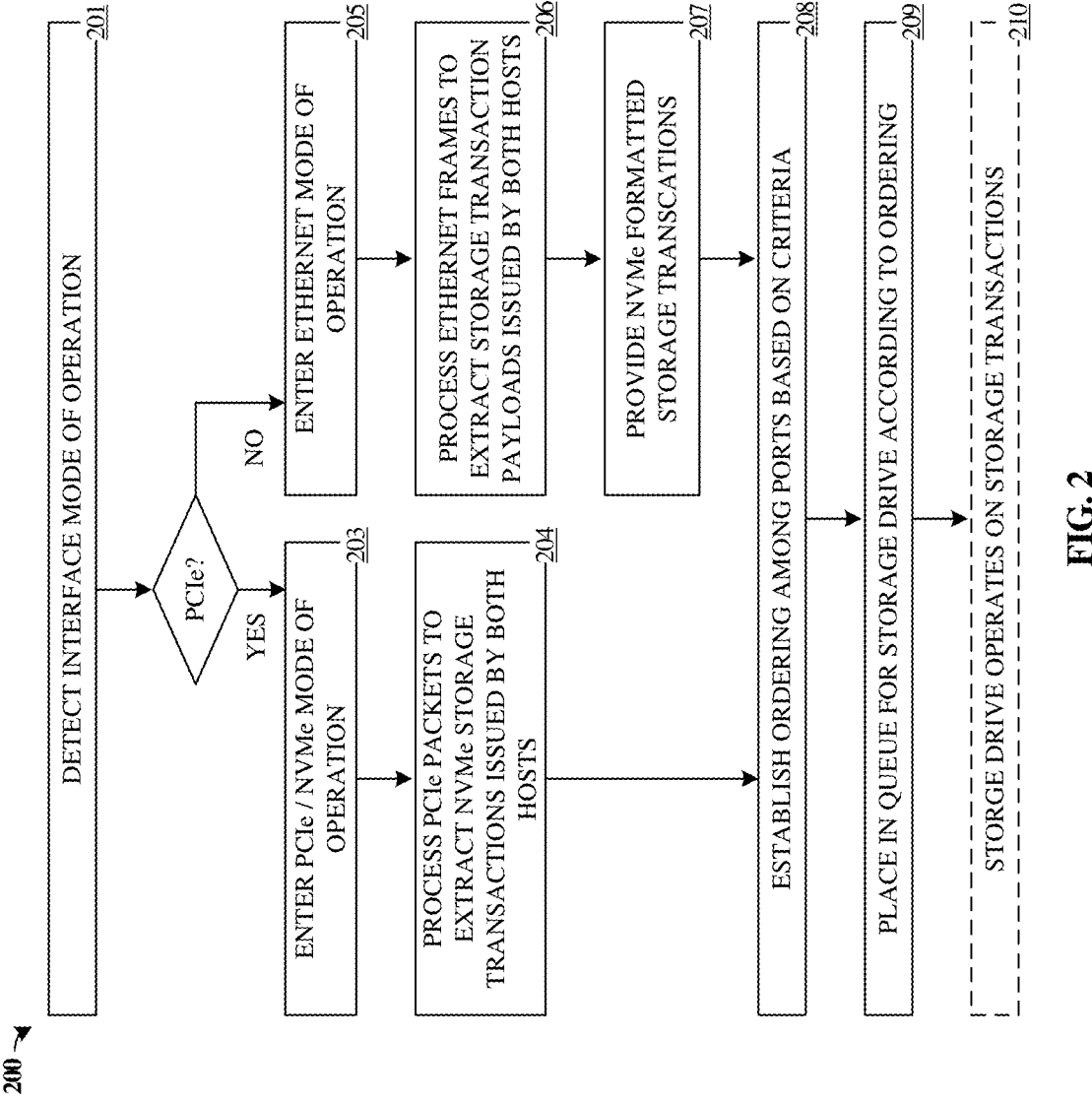
FIG. 2 is a diagram illustrating example operations for a storage interposer in an implementation, operating in a selectable front-end mode of operation.

Turning now to example operations for elements found in storage environment 100, FIG. 2 is presented. Storage interposer assembly 110 includes carrier 111 which comprises a chassis, sled, enclosure, housing, or other assembly element that can house circuitry of storage interposer assembly 110 and removably couple to storage drive 130. Storage interposer assembly 110 (e.g., carrier 111) can be further removably coupled into a storage or computing system, such as a midplane, backplane, rack, shelf, chassis, or other larger assembly which may include other iterations of carrier 111 and connected storage drives. Storage drive 130 can be coupled into carrier 111 at back-end storage connector 113, and storage interposer assembly 110 can be coupled into the larger assembly at front-end storage connector 112.

In operation 201, interposer processor 120 detects an interface mode of operation corresponding to front-end storage connector 112, which in this example might be selected among a PCIe/NVMe mode and an Ethernet mode. This detection can include sensing various pins or connections of front-end storage connector 112, or may instead include various logical/protocol handshaking detection associated with front-end connector links 116 and links 141-143. Moreover, two ports are included on front-end storage connector 112, and each port can correspond to a different host among hosts 190-191, or other nodes which can be coupled over various communication links, fabrics, networks, or other arrangements.

When PCIe/NVMe is detected (202) as the mode of front-end storage connector 112, then, interposer processor 120 enters a PCIe or NVMe mode of operation (203). Queue 121 can be established by interposer processor 120 to place storage transactions before transfer and handling to storage drive 130. Queue 121 can take various forms or data structure arrangements, such as a first-in, first-out arrangement (FIFO), among others, and comprise a software-based queue or hardware-based queue. Queue 121 can be sized according to a bandwidth of the storage interfaces as well as latency requirements, and have a data width that corresponds to sizes of storage transactions. The sizes of storage transactions can vary based on several factors, including which front-end mode of operation is detected and the maximum size of a storage transaction payload (e.g., write data) employed for such a mode of operation.

Thus, storage operations or storage transactions are received over front-end storage connector 112 and any of links 141-142. In the PCIe mode of operation, a PCIe link or links carry packets in a PCIe format which encapsulate or otherwise employ storage transactions in an NVMe format, which in this example comprises a storage format employed by storage drive 130. PCIe is a point-to-point link having a physical layer, data link layer, and transaction layer, which may include a switched communication fabric arrangement, and thus the PCIe signaling carries storage transactions in the NVMe format without overhead for network routing, further communication protocol layers, or other encapsulations used in Ethernet or other modes of operation. Interposer processor 120 can process the PCIe packets to extract storage transactions in the NVMe format issued by both hosts (204), and establish ordering among the ports for storage transactions placed into queue 121.

Interposer processor 120 can be configured to obtain indications included in the storage transactions of which port among the dual port interface supplied each of the storage transactions. The indications can comprise various flags, indicator elements, bits, header portions, or other various indications. In one example, the indications of which port among the dual port interface comprise one or more bits in headers of the storage transactions. The bits can be added by a host or hosts that originate or issue the storage transactions, as each specific host is aware of an identity of the port to which it is associated. The identity can comprise various binary, numerical, or alphanumeric identities, which can be distilled down to a binary (e.g., '0' or '1') indication by interposer processor 120, each binary level corresponding to a particular port among the dual ports of front-end storage connector 112 and links 141-142.

Interposer processor 120 can include a hardware state machine configured to process the indications to determine a sequencing among the ports that establishes the order in queue 121. The one or more criteria can comprise fairness criteria that produce at least a partially interleaved ordering in the queue among the ports according to sizes of the storage transactions. For example, a storage transaction could vary from 4 kilobytes (K) size to 128 bytes depending on whether the storage transactions comprise remote direct memory access PCIe frames or RDMA frames. So, the data flow established by the ordering in queue 121 can be configured to alternate between two ports based on the size of corresponding FIFOs for each port to avoid or reduce backpressure due to out-of-sync ingress and egress traffic.

Once the ordering has been established, which can occur on a transaction-by-transaction basis, provided by the hardware state machine or other elements, these ordered storage transactions can be placed into queue 121 (209), and the ordered storage transactions can be issued over link 114 to storge drive 130 for handling (210). Storage drive 130 can handle the storage transactions according to the type of storage transaction, such as read operations, write operations, metadata operations, or other commands. For write operations, storage drive 130 can commit write data to a storage medium (e.g., 132). For read operation, storage drive 130 can retrieve read data from a storage medium (e.g., 132) and transfer the read data over link 114 for eventual delivery to an associated host.

When Ethernet is detected (202) as the mode of front-end storage connector 112, then, interposer processor 120 enters an Ethernet (ETH) mode of operation (205). Queue 121 can be established by interposer processor 120 to place storage transactions before transfer and handling to storage drive 130. Queue 121 can be sized according to a bandwidth of the storage interfaces as well as latency requirements, and have a data width that corresponds to sizes of storage transactions. The sizes of storage transactions can vary based on several factors, including which front-end mode of operation is detected and the maximum size of a storage transaction payload (e.g., write data) employed for such a mode of operation.

Thus, storage operations or storage transactions are received over front-end storage connector 112 and any of links 141-142. In the ETH mode of operation, an ETH link or links carry frames or packets in an Ethernet format that span over many layers, including a physical layer, link layer (Ethernet, MAC addressing), network layer (IP, IP addressing), and transport layer (TCP/UDP), each with associated overhead, header information, and layer-specific properties. In the Ethernet mode of operation, frames or packets can encapsulate or otherwise contain storage transactions in an NVMe format, which in this example comprises a storage format employed by storage drive 130. Often, higher-layer protocols, such as IP can include further addressing, headers, and protocol features which might be employed by links 141-142. Ethernet frames and IP packets have various headers and packet/frame structure suitable for routing over associated physical links, and thus has overhead including flow control, error correction, addressing, and other overhead elements to support the various protocols. Moreover, many modes of operating Ethernet links require protocol termination operations, such as IP or MAC addressing, to establish routable network endpoints.

Thus, the Ethernet mode carries storage transactions in a particular format with substantial overhead for network routing, further communication protocol layers, or other encapsulations. Interposer processor 120 can comprise various network interfacing and processing elements to operate TCP/IP network links, and can process the frames or packets to extract storage transactions in a format issued by both hosts (206). Various other storage protocols than NVMe might be employed in the Ethernet mode of operation, such as InfiniBand (IB), FibreChannel, NVMe, or NVM Express over Fabrics (NVMe-oF), among others. However, regardless of the storage format employed in the Ethernet mode of operation, interposer processor 120 can establish storage transactions formatted in a storage format employed by storage drive 130, such as NVMe.

Once the storage transactions in the storage format are determined, interposer processor 120 can establish ordering (208) among the ports for storage transactions placed into queue 121. As with PCIe modes, interposer processor 120 can be configured to obtain indications included in the storage transactions of which port among the dual port interface supplied each of the storage transactions, such as a binary level corresponding to a particular port among the dual ports of front-end storage connector 112 and links 141-142. From here, similar operations as discussed above for operations 208-210 are provided for the Ethernet mode of operation. However, for read data and other responses returned to hosts 190-191, interposer processor 120 can include encapsulation of such data/responses into frames or packets for delivery to the hosts using the selected network formatting and addressing. This can include providing header information, assigning TCP/IP addressing and/or ports to various packets/frames, and transferring routable datagrams for delivery to the hosts.

Figure 3:
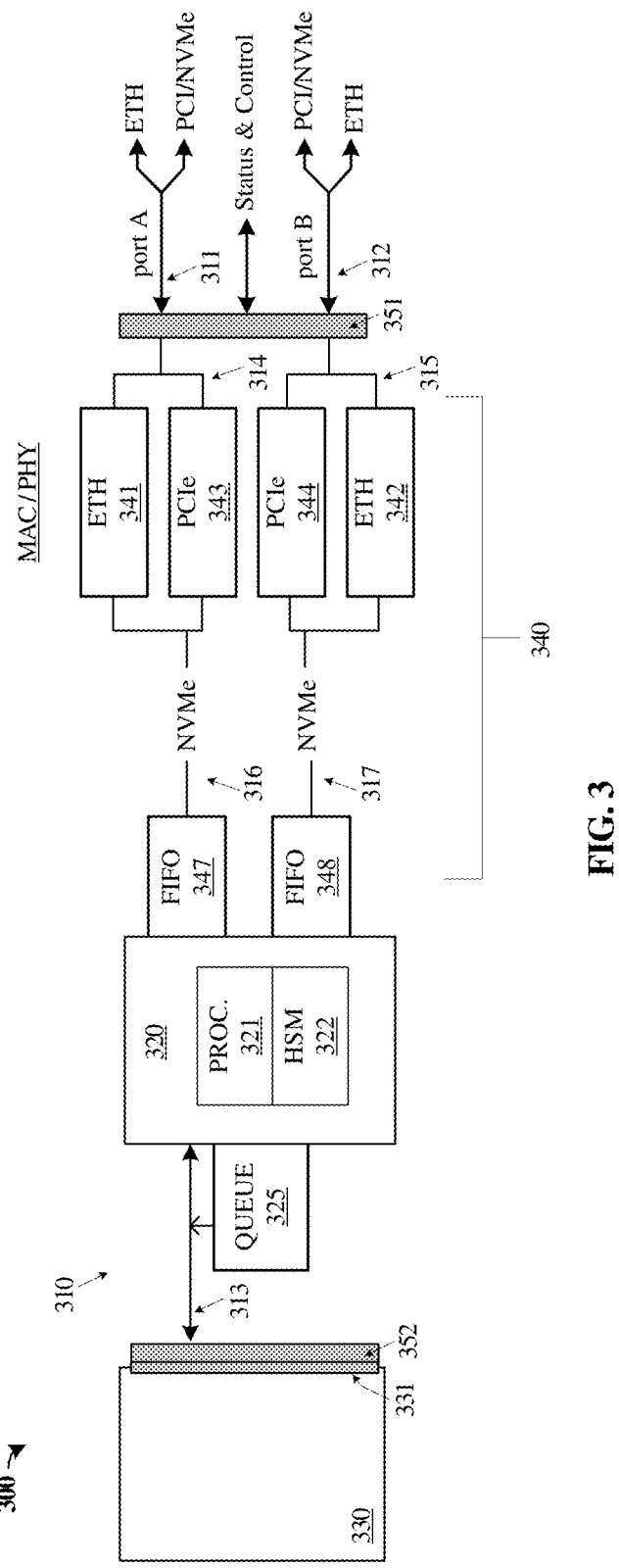
FIG. 3 is a diagram illustrating an example storage interposer in an implementation.

For a more detailed illustration of the elements of FIG. 1, system 300 is presented in FIG. 3. FIG. 3 is a diagram illustrating an example storage interposer 310 in an implementation. While similar elements can be employed in both storage environment 100 and system 300, variations are possible.

System 300 includes storage interposer 310 which couples to storage drive 330. Front-end storage connector

351 couples to front-end element 340 over links 314-315. Front-end elements 340 include various interfacing, networking, and link management elements, namely Ethernet modules 341-342 and PCIe modules 343-344 that couple to FIFOs 347-348 over NVMe links 316-317. Interposer module 320 includes interposer processor 321, hardware state machine (HSM) 322, (optionally) queue 325, and (optionally) FIFOs 347-348. Queue 325 feeds storage drive link 313 which couples to storage drive 330 over connector 352 coupled to storage drive connector 331.

In operation, interposer 310 can establish a dual port drive carrier for a single port storage drive, namely for storage drive 330. This dual port carrier can provide connections to two concurrent hosts for a storage drive natively capable of only single port operation. Advantageously, this configuration can provide for easier replacement of storage drives in enterprise computing environments. Moreover, interposer 310 can operate over selected interfaces among an Ethernet/IP interface and a PCIe/NVMe interfaces. The interfaces can be selected based on detection of an interface type after insertion or plugging in of front-end connector 351 into a corresponding mating connector of a chassis, server, tray, rackmount system, or other enclosure/circuit board arrangement.

Various storage drive connectors are employed in interposer 310. For example, front-end storage connector 351 and back-end or storage drive connector 352. While variations are possible, typical examples include use of U.2 style of connectors that conform to various mechanical and electrical standards, such as the SFF-TA-8639 mechanical specification and the SFF-9639 electrical/pinout specification. Variations include the SFF-9639-ETH standard used to carry Ethernet signaling instead of PCIe signaling. Front-end storage connector 351 can be configured to at least partially share electrical connections of the connector among a first interface protocol (e.g., PCIe) and a second interface protocol (e.g., Ethernet). Also, improvements to the U.2 interface can be employed, such as the U.3 interface standard and beyond, which remain mechanically compatible with U.2. Furthermore, other connection standards and types might be employed with interposer 310 providing similar functionality. These other connection types include M.2, M.3, Next Generation Small Form Factor (NGSFF/NF1), Enterprise and Data Center Standard Form Factor (EDSFF) connector, or MCIO connector, among others. Thus, the techniques, functionality, structures, circuitry, and operations herein are not limited to a particular connector type. However, it should be noted that whatever connector type is selected typically supports more than one host connection, such as dual-port connections (or more).

Interposer module 320 includes interposer processor 321 and can comprise hardware elements such as circuitry and logic that implement one or more control schemes or state machine arrangements to perform as described herein at least for ordering/interleaving of storage transactions. HSM 322 is one example implementation of hardware-based circuitry to perform as described herein at least for ordering/interleaving of storage transactions. Interposer processor 321 can comprise one or more microprocessors, processing devices, multi-core processors, processing circuitry, or other processing systems that can execute software or firmware. Interposer processor 321 can include one or more non-transitory memory/storage devices, such as RAM, solid state storage, or other memory to store instructions comprising software or firmware that are executable by interposer processor 321 to operate as discussed herein. These memory/storage devices can be used to implement queue 325 and FIFOs 347-348. Queue 325 may also comprise a FIFO structure which may have a size of 8K in some examples. FIFOs 347-348 can be sized at 128K in some examples. Interposer processor 321 can include various communication interfaces, such as storage interfaces, packet/network interfaces, sideband interfaces, and other interfaces.

ETH modules 341-342 each provide network interfacing elements comprising link physical layer (PHY) elements. ETH modules 341-342 can include Ethernet media access control (MAC) modules, network interface controller elements, or portions of the network interface controller can be included in interposer processor 321. Either ETH modules 341-342 or interposer processor 321 can provide network layer processing, port handling, addressing functionality. ETH modules 341-342 accept Ethernet signaling of a selected physical link type, such as differential pair, and output datagrams or other signaling. In some examples, ETH modules 341-342 each comprise 50/100 Gigabit Ethernet (GbE) MAC to NVMe modules, which may support RDMA over Converged Ethernet (RoCE) (v2), UDP, or InfiniBand over Ethernet (IBoE). In some examples, the datagrams are provided to processor 321 to perform network layer processing and extract encapsulated NVMe or other storage transactions which are provided to FIFOs 347-348. In other examples, ETH modules 341-342 can perform network layer processing and extract encapsulated NVMe or other storage transactions which are provided to FIFOs 347-348.

PCIe modules 343-344 each provide communication interfacing elements comprising link physical layer (PHY) elements for PCIe links. PCIe modules 343-344 can include signal handling, link decoding, link management, and other link level processing/handling. PCIe modules 343-344 can provide NVMe storage transactions to FIFOs 347-348 after extraction of PCIe-carried NVMe storage transactions. PCIe modules 343-344 can also comprise processing circuitry and communication interface circuitry to act as NVMe endpoint/ targets to receive PCIe signaling containing NVMe transactions. PCIe modules 343-344 can handle NVMe target roles with respect to external hosts that issue storage transactions. NVMe protocol handling, handshaking, status, telemetry, and reporting can be provided by PCIe modules 343-344.

Storage drive 330 includes storage drive connector 331 and various storage controller and storage media elements (not shown for clarity). Here, storage drive 330 is a single-port device, referring to storage drive 330 being able to natively communicate with only a single host. However, some examples might include storage drive 330 being a dual-port device operated in a single-port mode. Storage connector 331 can comprise a U.2 connector, among others discussed herein for storage connector 131. Storage media can comprise solid state storage media, such as flash memory or other solid state physical media.

Links 311-317 can describe any physical link capable of carrying the communications and signaling described herein. Examples of links 311-317 can correspond to the types described above for links 141-142, although variations are possible. Links 311-317 might include discrete links, composite links, serial links, parallel links, multi-lane links, single-lane links, differential pairs, twisted pairs, printed circuit board traces, optical signaling, wireless signaling, and other configurations. Links 311-312 can be referred to as 'ports' herein. Links 311 and 312, when in a PCIe mode, can comprise a 2-lane (×2) PCIe port, which can include various generations of PCIe. Links 311 and 312, when in an Ethernet mode, can have signaling comprising Pulse Amplitude Modulation 4-level (PAM4), among others. Link 313 can comprise a 4-lane (×4) PCIe link.

Figure 4:
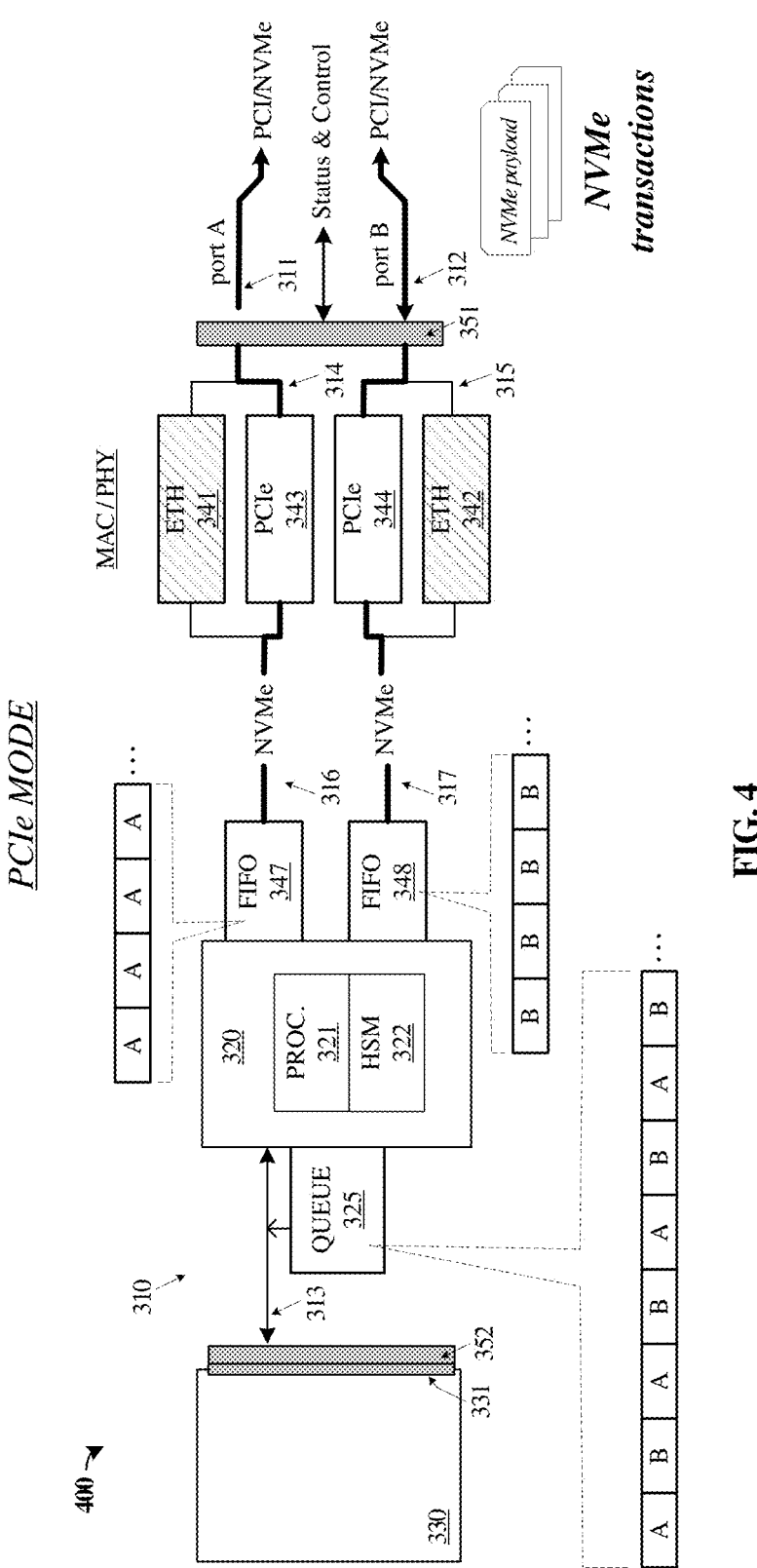
FIG. 4 is a diagram illustrating an example storage interposer in an implementation, operating in an NVMe or PCIe front-end mode of operation.
Figure 5:
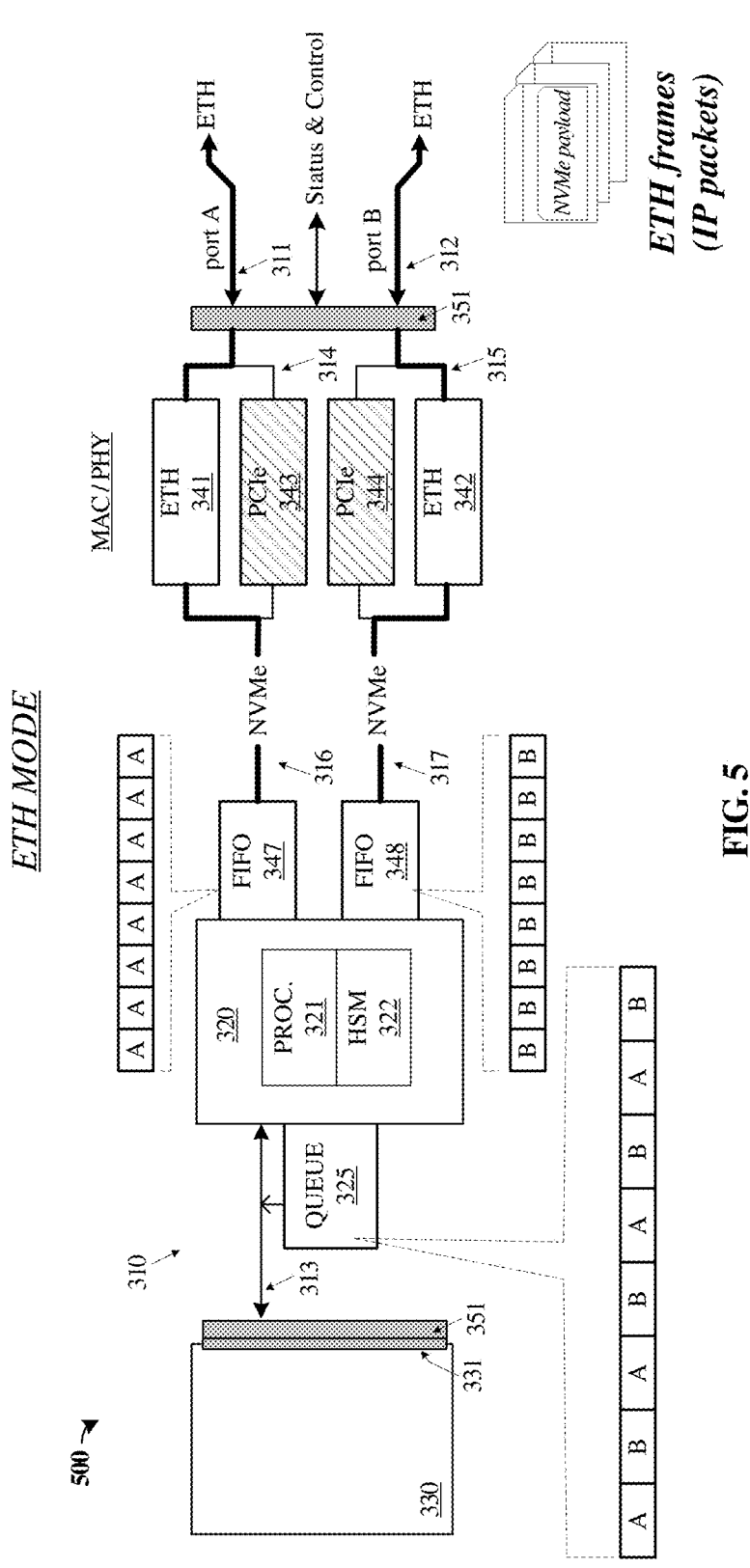
FIG. 5 is a diagram illustrating an example storage interposer in an implementation, operating in an Ethernet front-end mode of operation.

Turning now to the operations of elements of FIG. 3, FIGS. 4 and 5 are presented. FIG. 4 relates to a PCIe/NVMe mode of operation, such as when interposer 310 is coupled to a U.2 mating connector carrying PCIe/NVMe signaling for two concurrent hosts. FIG. 5 relates to an Ethernet or IP mode of operation, such as when interposer 310 is coupled to a U.2 mating connector carrying Ethernet signaling for two concurrent hosts. Upstream from connector 351 of interposer 310 might be various computing modules, controllers, routers, switches, or fabric elements that are enclosed in a chassis along with many other instances of interposer 310 carrying associated storage drives.

FIG. 4 illustrates a PCIe mode of operation, and connector 351 is coupled to a mating connector configured to carry PCIe signaling. Links 311-312 comprise PCIe links, such as 2-lanes (×2) each, and can support various generations of PCIe. From here, links 314-315 couple to PCIe modules 343-344. PCIe modules 343-344 receive storage transactions, each form a different host, which issues these storage transactions for handling by a storage drive. In this example, storage drive 330 eventually receives the storage transactions after an interleaved ordering among the ports is established. Before reaching the interleaving and the storage drive, the storage transactions of each port are provided by PCIe modules 343-344 over links 316-317 to FIFOs 347-348.

As shown in FIG. 4, FIFOs 347-348 each store storage transactions for a corresponding port, with port 'A' storage transactions residing in FIFO 347 and port 'B' storage transactions residing in FIFO 348. These storage transactions can be stored as NVMe storage transactions, and include various payload data (for writes) and transaction headers, commands, and other accompanying transaction information. The quantity of storage transactions is shown as four (4) in FIG. 4 for simplicity, but a different quantity can be stored, depending on data payload sizes, operating preferences, latency requirements, bandwidths of the various storage interfaces, and other factors.

HSM 322 establishes an ordering among retrieval of storage transactions from each of FIFOs 347-348, such that each port A and B receive a fairness of utilization of the storage link 313. This ordering can include interleaving or alternating among the ports. However, some examples might have to ensure fairness by draining transactions from one FIFO more frequently or in larger chunks than another FIFO, which can depend on operational conditions, a current quantity of transactions in each FIFO, and other factors. For example, both hosts might not be presently issuing an equal number of storage transactions, and the fairness might include ensuring both ports timeshare usage of link 313 and storage drive 330 according to the number of storage transactions issued, or to maintain a response latency for a particular host. HSM 322 places the ordered storage transactions into queue 325, which typically also comprises a FIFO structure. In one example, writes and associated write data is interleaved between Port A and B in 128 KB segments, as shown in FIG. 4 as example contents of queue 325.

Storage drive 330 then handles the storage transactions according to the ordering in queue 325. Outbound read data or other return traffic is typically routed through similar links and interfaces as the incoming storage transactions. However, no throttling through the interposer is typically encountered, as the scheduling of inbound requests through the interposer guarantees fairness for outbound traffic.

FIG. 5 illustrates an Ethernet/IP mode of operation, and connector 351 is coupled to a mating connector configured to carry Ethernet signaling. Links 311-312 comprise Ethernet links, such as 50/100 Gigabit Ethernet (GbE). From here, links 314-315 couple to ETH modules 341-342. ETH modules 341-342 receive storage transactions, each form a different host, which issues these storage transactions for handling by a storage drive. In this example, storage drive 330 eventually receives the storage transactions after an interleaved ordering among the ports is established. Before reaching the interleaving and the storage drive, the storage transactions of each port are provided by ETH modules 341-342 over links 316-317 to FIFOs 347-348. Processor 321 might correspond with ETH modules 341-342 to provide link termination features, among other Ethernet or network stack functionality.

Pins or connections of connector 351 used for PCIe signaling in FIG. 4 can be repurposed for Ethernet signaling in FIG. 5, along with other pins which might include sideband pins, unused or unspecified pins, power/ground pins, or other pins. Depending on the connection standard employed (or a custom configuration), the various TX– and TX+ pins can be connected to an Ethernet receiver differential pair on connector 351. The various RX– and RX+ pins can be connected to an Ethernet transmitter differential pair on connector 351.

As shown in FIG. 5, FIFOs 347-348 each store storage transactions for a corresponding port, with port 'A' storage transactions residing in FIFO 347 and port 'B' storage transactions residing in FIFO 348. These storage transactions can be stored as NVMe storage transactions, and include various payload data (for writes) and transaction headers, commands, and other accompanying transaction information. The quantity of storage transactions is shown as eight (8) in FIG. 5 for simplicity, but a different quantity can be stored, depending on data payload sizes, operating preferences, latency requirements, bandwidths of the various storage interfaces, and other factors.

HSM 322 establishes an ordering among retrieval of storage transactions from each of FIFOs 347-348, such that each port A and B receive a fairness of utilization of the storage link 313. This ordering can include interleaving or alternating among the ports. However, some examples might have to ensure fairness by draining transactions from one FIFO more frequently or in larger chunks than another FIFO, which can depend on operational conditions, a current quantity of transactions in each FIFO, and other factors. For example, both hosts might not be presently issuing an equal number of storage transactions, and the fairness might include ensuring both ports timeshare usage of link 313 and storage drive 330 according to the number of storage transactions issued, or to maintain a response latency for a particular host. HSM 322 places the ordered storage transactions into queue 325, which typically also comprises a FIFO structure. In one example, writes and associated write data is interleaved between Port A and B in 128 KB segments, as shown in FIG. 4 as example contents of queue 325.

Storage drive 330 then handles the storage transactions according to the ordering in queue 325. Outbound read data or other return traffic is typically routed through similar links and interfaces as the incoming storage transactions. However, no throttling through the interposer is typically encountered, as the scheduling of inbound requests through the interposer guarantees fairness for outbound traffic.

Figure 6:
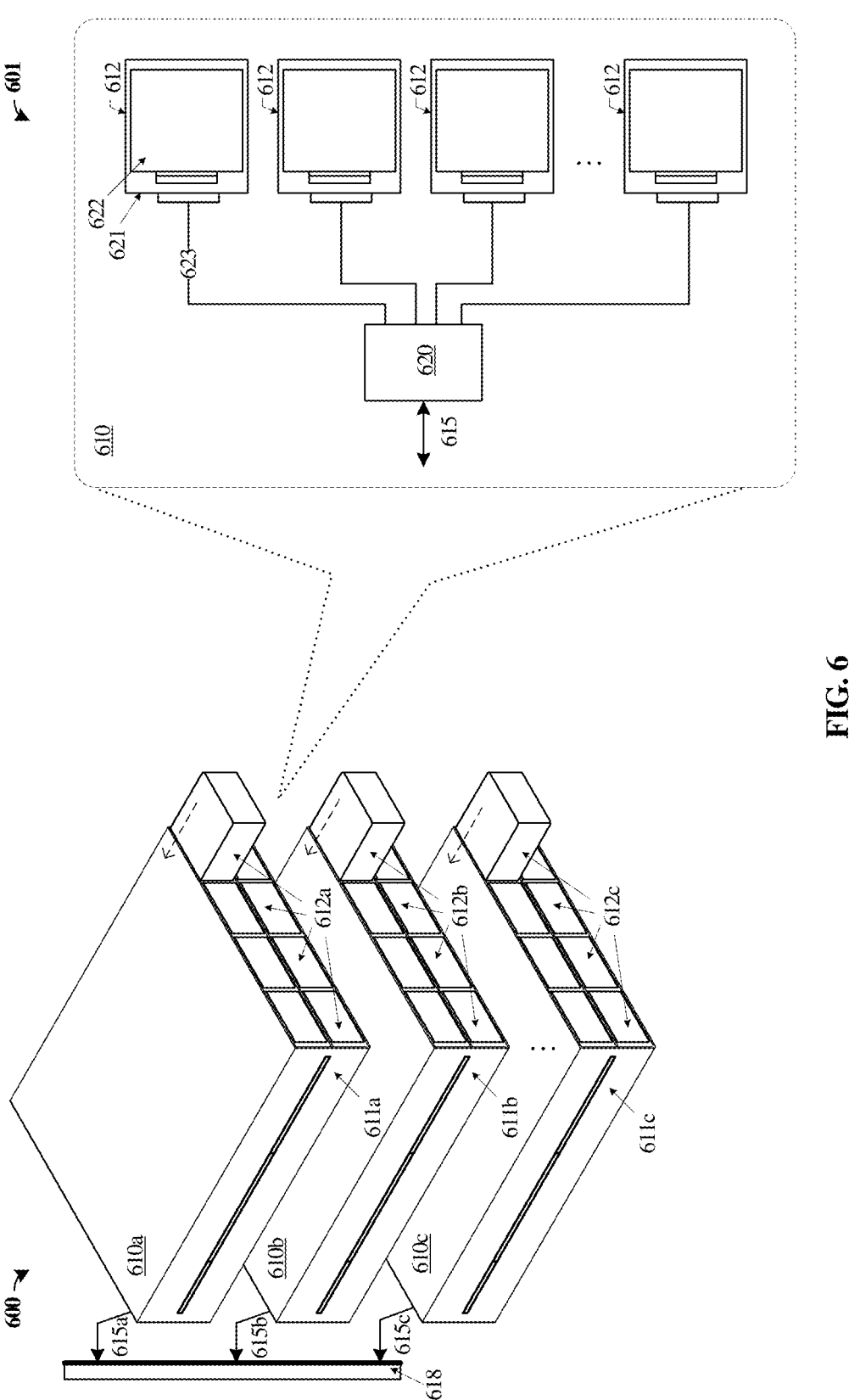
FIG. 6 is a diagram illustrating an example rack mounted storage system in an implementation.

FIG. 6 is a diagram illustrating an example rack mounted storage system 600 in an implementation. Storage system 600 includes a selected or arbitrary quantity of chassis 610, with instances a, b, and c shown. Each chassis 610 can include an enclosure (e.g., 611) and mechanical fixtures for insertion and operation in a rack or other superstructure. While a rack or external structure is not required, many implementations (such as data centers, cloud computing centers, or multi-server installations) employ rack-mounted equipment in high-density networked configurations.

Each chassis 610 includes an array of storage assemblies 612, with one assembly shown during insertion and other assemblies shown as already inserted into the chassis. Upon insertion, each storage assembly 612 can couple into a mating connector on a mid-plane or back-plane, which can provide for power, communication routing, telemetry, maintenance interfacing, and other links. For example, each storage assembly 612 can receive power and have one or more storage links coupled thereto within an associated chassis. Hot-swapping or other modular arrangements can be employed.

External links 615 are shown for each chassis 610, which couple communication links to each storage assembly 612. External links 615 can couple to further communication nodes, switches, fabrics, links, or other communication systems, shown as communication fabric 618 in FIG. 6. External links 615 can include PCIe links, Ethernet links, NVMe links, or any link type discussed herein, such as for links 141-142 of FIG. 1. External links 615 can provide for cross-coupling among each chassis 610, to provide for communication among storage assemblies 612 or other chassis communication, controller, switch, fabric, or other circuitry and link arrangement. Thus, elements of each chassis 610 can be configured to communicate with elements of other chassis 610 over links 615 and communication fabric 618.

View 601 is also included in FIG. 6 to show one example schematic view of a chassis 610. In view 601, each storage assembly 612 can include an interposer 621 that carries a storage drive 622. A dual-port storage link 623 is provided by each interposer 621 for single-port storage drive 622. Links 623 all couple to interfacing element 620. Interfacing element 620 can comprise different configurations depending on the implementation of each chassis. In one example, interfacing element 620 comprises an Ethernet switch which communicates with each corresponding interposer 621 over Ethernet links. Link 615 can provide further Ethernet linking to other chassis or to further networks. In another example, interfacing element 620 can comprise a storage controller which communicates over PCIe signaling with each corresponding interposer 621 over PCIe links that carry NVMe communications. Further examples can include interfacing element 620 comprising other communication fabric switch circuitry or control and interfacing circuitry. Interfacing element 620 can include various communication processing and routing elements, software/firmware, processing circuitry, and communication interfaces. It should be understood that interfacing element 620 can include more than one communication interface type, such as both Ethernet and PCIe, among other types.

In operation, storage drives 622 can be carried by corresponding interposers 621 which are inserted into chassis 610. Each chassis 610 can have link 615 communicatively coupled to other systems, such as networks, hosts, servers, further racks, other computing components, and the like. Storage operations or transactions can be issued by these other systems and transferred over the corresponding communication interfaces for handling by selected storage drives. Routing can be provided by various addressing, packet handling, handshaking, fabric isolations, and other techniques, to ensure the storage transactions are delivered to appropriate chassis, interfacing elements, and interposers. From here, the interposers can handle the storage transactions according to the various example techniques described herein, and transfer the transactions and associated data to storage drives. Also, various ordering, interleaving, or sequencing of storage transactions among dual-port interposer interfaces can be achieved (within each interposer), among other enhanced operations.

Figure 7:
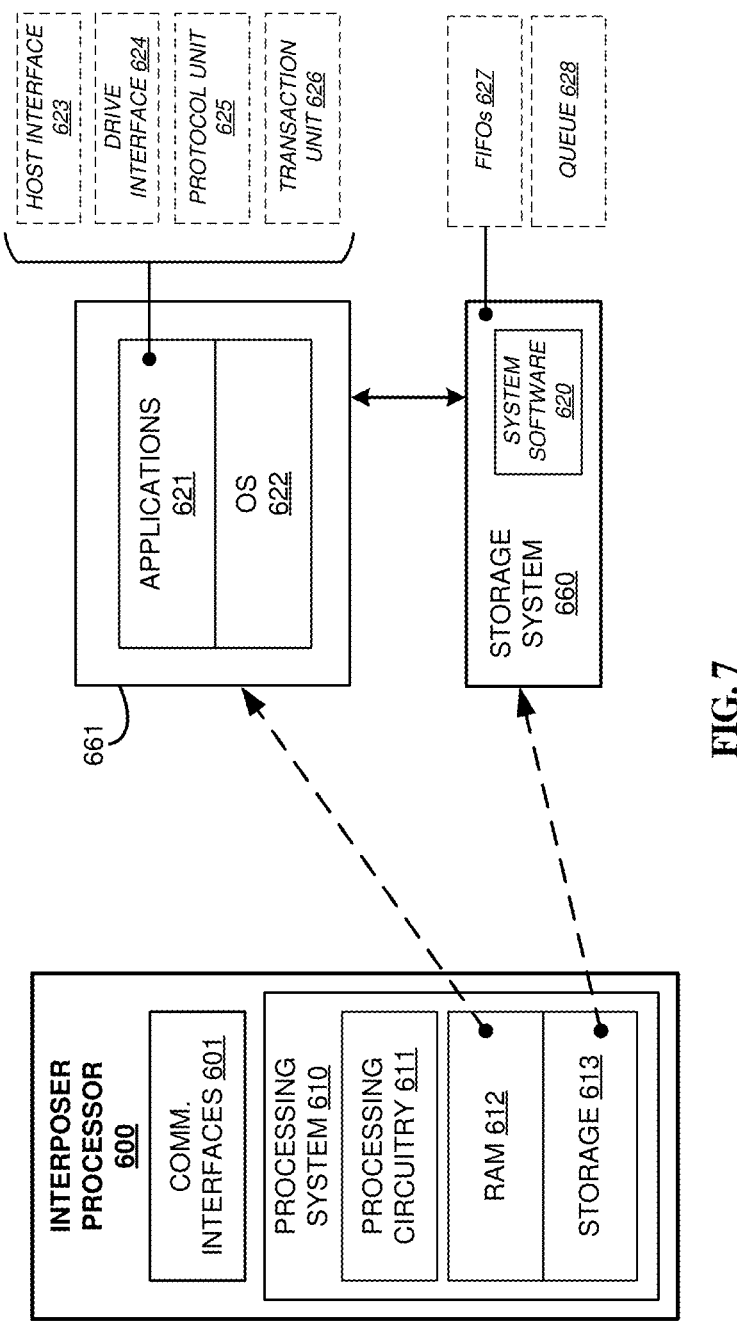
FIG. 7 illustrates an example interposer processor capable of implementing any of the various storage apparatuses, control elements, interposer elements, systems, and associated elements discussed herein.

FIG. 7 is a block diagram illustrating computing element 700. Computing element 700 illustrates an example of any of the storage interposer systems, interposer modules, interposer processing systems, interposer circuitry, or interposer microcontrollers discussed herein, such as interposer processor 120 in FIG. 1 or interposer module 320 of FIG. 1.

Control processor 700 includes communication interface 701 and processing system 710. Processing system 710 includes processing circuitry 711, random access memory (RAM) 712, and storage 713, although further elements can be included. Example contents of RAM 712 are further detailed in RAM space 761, and example contents of storage 713 are further detailed in storage system 760.

Processing circuitry 711 can be implemented within a single processing device but can also be distributed across multiple processing devices or sub-systems that cooperate in executing program instructions. Examples of processing circuitry 711 include general purpose central processing units, microprocessors, application specific processors, and logic devices, as well as any other type of processing device. In some examples, processing circuitry 711 includes physically distributed processing devices.

Communication interface 701 includes one or more communication and network interfaces for communicating over communication links, networks, such as packet networks, the Internet, and the like. The communication interfaces can include one or more PCIe interfaces, serial links, such as SPI links, I2C links, USB links, UART links, or one or more network communication interfaces which can communicate over Ethernet or Internet protocol (IP) links. Communication interface 701 can include network interfaces configured to communicate using one or more network addresses, which can be associated with different network links. Examples of communication interface 701 include network interface card equipment, transceivers, modems, and other communication circuitry.

RAM 712 and storage 713 together can comprise a non-transitory data storage system, although variations are possible. RAM 712 and storage 713 can each comprise any storage media readable by processing circuitry 711 and capable of storing software. RAM 712 can include volatile and nonvolatile, removable and non-removable media implemented in any method or technology for storage of information, such as computer readable instructions, data structures, program modules, or other data. Storage 713 can include non-volatile storage media, such as solid state storage media, flash memory, phase change memory, or magnetic memory, including combinations thereof. RAM 712 and storage 713 can each be implemented as a single storage device but can also be implemented across multiple storage devices or sub-systems. RAM 712 and storage 713 can each comprise additional elements, such as controllers, capable of communicating with processing circuitry 711.

Software stored on or in RAM 712 or storage 713 can comprise computer program instructions, firmware, or some other form of machine-readable processing instructions having processes that when executed a processing system direct control processor 700 to operate as described herein. For example, software can drive processor 700 to receive storage transactions transferred by multiple hosts and order those storage transactions according to one or more criteria into a queue for handling by a storage drive, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

RAM space 761 illustrates a detailed view of an example configuration of RAM 712. It should be understood that different configurations are possible. RAM space 761 includes applications 721 and operating system (OS) 722. Software applications 723-726 each comprise executable instructions which can be executed by processor 700 for operating according to the operations discussed herein.

Specifically, host interface 723 provides interface control, protocol handling, layer/stack processing, and endpoint roles for various communication or network interfaces, such as PCIe and Ethernet. Front-end interfacing and signaling is handled by host interface 723, which can include dual interfaces/ports, port type detection, and sideband/overhead signaling.

Drive interface 724 provides interfacing with a storage drive on a back-end of a storage interposer, and can include interworking with queue 728 to provide storage transactions for handling by an external storage drive. Drive interface 724 can handle write transactions, read transactions, metadata transactions, drive initialization and maintenance handling, and other drive functionality.

Protocol unit 725 works with host interface 723 to handle communications for a selected protocol, such as Ethernet or IP frame/packet decoding, network stack processing, protocol type detection, and other operations. In one example, protocol unit 726 is configured to obtain communications received over the dual port interface and transfer storage transactions in a storage format. Protocol unit 726 might receive the storage transactions in an Ethernet protocol and process a network packet format to produce storage transactions having a storage format (e.g., NVMe).

Transaction unit 726 handles individual storage transactions to obtain storage transactions from FIFOs and place into a shared queue (728) for delivery to a storage drive. Transaction unit 726 is configured to obtain the storage transactions in a storage format (e.g., NVMe) and process indications of which port among the dual port interface supplied each of the storage transactions against one or more criteria to order the storage transactions into a queue 728 shared among the ports, where a single port storage drive coupled to the storage interposer is issued the storage transactions from the queue according to the order. Transaction unit 726 might instead comprise a hardware state machine (e.g., HSM 322) separate from software 720 that is configured to process the indications to determine a sequencing among the ports that establishes the order for storage transactions in queue 728.

Applications 721 and OS 722 can reside in RAM space 761 during execution and operation of control processor 700, and can reside in storage system 760 during a powered-off state, among other locations and states. Applications 721 and OS 722 can be loaded into RAM space 761 during a startup or boot procedure as described for computer operating systems and applications. FIFOs 727 and queue 728 are shown included in storage 713, but may instead be implemented in RAM 712, in discrete/dedicated memory elements, or in external circuitry.

Storage system 760 illustrates a detailed view of an example configuration of storage 713. Storage system 760 can comprise flash memory such as NAND flash or NOR flash memory, phase change memory, magnetic memory, among other solid state storage technologies. As shown in FIG. 7, storage system 760 includes system software 720 and FIFOs 727 and queue 728. As described above, system software 720 can be in a non-volatile storage space for applications and OS during a powered-down state of control processor 700, among other operating software.

Control processor 700 is generally intended to represent a computing system with which at least software 720 is deployed and executed in order to render or otherwise implement the operations described herein. However, control processor 700 can also represent any computing system on which at least software 720 can be staged and from where software 720 can be distributed, transported, downloaded, or otherwise provided to yet another computing system for deployment and execution, or yet additional distribution.

The functional block diagrams, operational scenarios and sequences, and flow diagrams provided in the Figures are representative of exemplary systems, environments, and methodologies for performing novel aspects of the disclosure. The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosed examples. Those skilled in the art will also appreciate that the features described above can be combined in various ways to form multiple implementations. As a result, the invention is not limited to the specific implementations described above, but only by the claims and their equivalents. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A storage interposer, comprising:

a first storage device connector configured to couple a dual port interface;

a second storage device connector configured to couple a single port interface;

a protocol unit configured to obtain communications received over ports of the dual port interface and transfer storage transactions in a storage format; and a transaction unit configured to obtain the storage transactions in the storage format, process indications of which port among the dual port interface supplied each of the storage transactions to order the storage transactions into a queue shared among the ports, with interleaving among the ports of the dual port interface established at least according to fairness of utilization of the single port interface by hosts communicating over the dual port interface, and issue the storage transactions from the queue according to the order for delivery over the single port interface.

2. The storage interposer of claim 1, wherein the first storage device connector is configured to provide connections for:

the ports of the dual port interface that carry at least one among a Peripheral Component Interconnect Express (PCIe) protocol transporting the storage transactions having a Non-Volatile Memory Express (NVMe) format, and an Ethernet protocol transporting the storage transactions encapsulated into a network packet format.

3. The storage interposer of claim 2, wherein the protocol unit is configured to receive the storage transactions in the Ethernet protocol and process the network packet format to produce the storage transactions having the NVMe format.

4. The storage interposer of claim 3, wherein the transaction unit is configured to obtain the storage transactions in the storage format comprising the NVMe format such that the storage transactions received in the Ethernet protocol and the storage transactions received in the PCIe protocol are stored in the queue in the NVMe format.

5. The storage interposer of claim 1, wherein the indications of which port among the dual port interface comprise one or more bits added in headers of the storage transactions by issuing hosts that indicate port identities associated with the hosts.

6. The storage interposer of claim 1, wherein the transaction unit includes a hardware state machine configured to process the indications to determine a sequencing among the ports that establishes the order.

7. The storage interposer of claim 1, wherein the fairness of utilization is established at least according to sizes of the storage transactions for each of the ports.

8. The storage interposer of claim 1, wherein:

the first storage device connector comprises a first U.2 or U.3 storage drive connector; and the second storage device connector comprises a second U.2 or U.3 storage drive connector.

9. The storage interposer of claim 2, wherein:

the first storage device connector is configured to at least partially share electrical connections of the first storage device connector among the PCIe protocol and the Ethernet protocol; and the protocol unit is configured to detect a presently employed one among the PCIe protocol and the Ethernet protocol.

10. The storage interposer of claim 1, comprising:

a carrier assembly configured to removably couple a single port storage drive over the second storage drive connector.

11. An apparatus, comprising:

a host interface configured comprising a first storage device connector configured to couple a dual port interface selected among a first interface protocol and a second interface protocol;

a drive interface comprising a second storage device connector configured to couple a single port storage drive; and an interposer processor configured to detect among the first interface protocol and the second interface protocol at the host interface, transfer storage transactions received over the dual port interface in a storage format, process indications of which port among the dual port interface supplied each of the storage transactions to order the storage transactions into a queue shared among the ports, with interleaving among ports of the dual port interface established at least according to fairness of utilization of the drive interface by hosts communicating over the dual port interface, and issue the storage transactions from the queue according to the order for delivery over the drive interface.

12. The apparatus of claim 11, wherein the first interface protocol corresponds to a Peripheral Component Interconnect Express (PCIe) protocol transporting the storage transactions having a Non-Volatile Memory Express (NVMe) format, and the second interface protocol corresponds to an Ethernet protocol transporting the storage transactions encapsulated into a network packet format.

13. The apparatus of claim 12, wherein the interposer processor is configured to receive the storage transactions in the Ethernet protocol and process the network packet format to produce the storage transactions having the NVMe format.

14. The apparatus of claim 11, wherein the indications of which port among the dual port interface comprise one or more bits added in headers of the storage transactions by the hosts that indicate port identities associated with the hosts.

15. The apparatus of claim 11, wherein the interposer processor includes a hardware state machine configured to process the indications to determine a sequencing among the ports that establishes the order.

16. The apparatus of claim 11, wherein the fairness of utilization is established at least according to sizes of the storage transactions for each of the ports of the dual port interface.

17. The apparatus of claim 11, wherein:
the first storage device connector comprises a first U.2 or U.3 storage drive connector; and
the second storage device connector comprises a second U.2 or U.3 storage drive connector.

18. The apparatus of claim 11, wherein:
the host interface is configured to at least partially share electrical connections of a storage device connector among the first interface protocol and the second interface protocol; and
the interposer processor is configured to detect a presently employed one among the first interface protocol and the second interface protocol.

19. A method, comprising:
detecting among a first interface protocol and a second interface protocol employed for a dual port host interface comprising a first storage device connector; and processing header indications added by hosts into storage transactions received over the dual port host interface of which port among the dual port host interface supplied each of the storage transactions to order the storage transactions into a queue shared among the ports with interleaving among the ports established at least according to fairness of utilization of a single port interface by the ports of the dual port interface for issuance of the storage transactions to a single port storage drive coupled over the single port interface from the queue according to the order.

20. The method of claim 19, comprising:
processing at least the indications by a hardware state machine to determine a sequencing among the ports that establishes the order;
wherein the fairness of utilization is established at least according to sizes of the storage transactions for each of the ports.

21. A storage system, comprising:
a chassis configured to couple interposers carrying storage drives and comprising communication interfacing circuitry for storage links of the interposers;
wherein each of the interposers comprise:
a storage device connector configured to couple a dual port interface;
a protocol unit configured to obtain communications received over the dual port interface and transfer storage transactions in a storage format; and
a transaction unit configured to obtain the storage transactions in the storage format and process indications of which port among the dual port interface supplied each of the storage transactions to order the storage transactions into a queue shared among the ports, with interleaving among the ports of the dual port interface established at least according to fairness of utilization of a single port interface by the ports of the dual port interface, and issue the storage transactions from the queue according to the order for delivery over the single port interface for handling by a single port storage drive coupled to the single port interface.

* * * * *